Apr. 10, 1923
D. Mc RUER ET AL
1,451,621
LICENSE PLATE
Filed Apr. 3, 1922
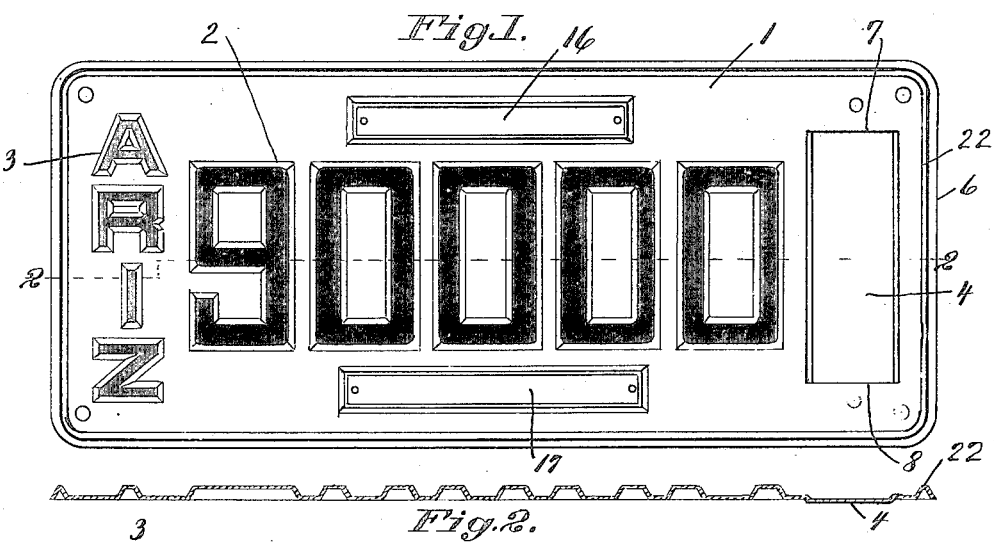
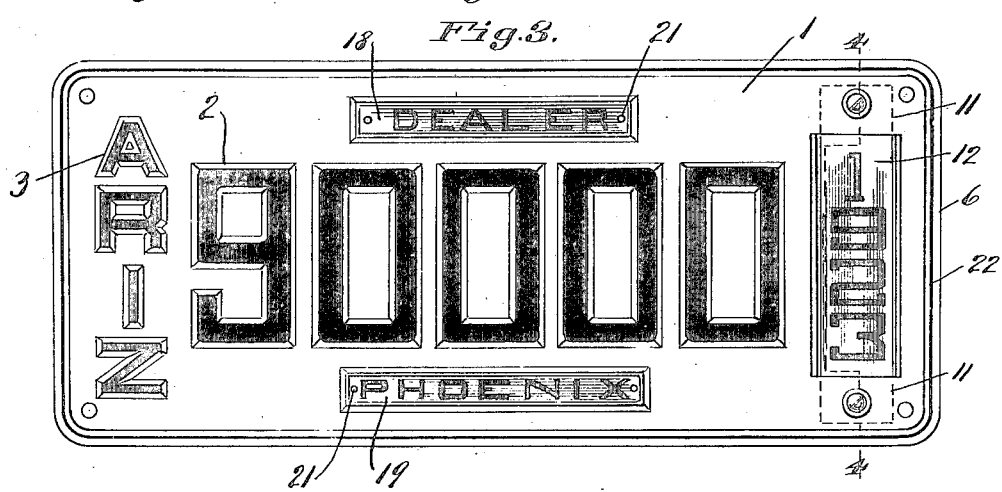
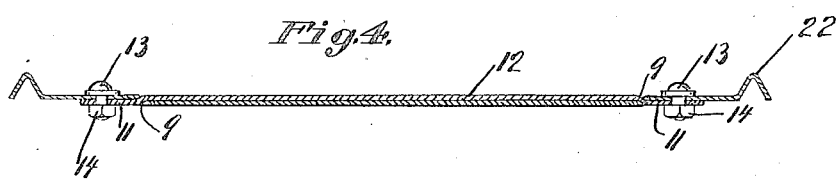
Inventors.
Don McRuer.
James E. Sellers.
By
attorneys Patented Apr. 10, 1923.

1,451,621

UNITED STATES PATENT OFFICE.

DONALD McRUER AND JAMES E. SELLERS, OF PHOENIX, ARIZONA.

LICENSE PLATE.

Application filed April 3, 1922. Serial No. 549,275.

*To all whom it may concern:*

Be it known that we, DONALD MCRUER and JAMES E. SELLERS, citizens of the United States, and residents, respectively, of Phoenix, county of Maricopa, and State of Arizona, have invented a new and useful License Plate, of which the following is a specification.

The present invention relates to improvements in license plates and its particular object is to provide a license plate for motor vehicles that may be used permanently and does not require replacement every year like The present license plate now commonly used in the different States. It is observed that a license plate ordinarily provides three different data, a license number, the name of the licensing State, and the year for which the license plate is to be used. It will be seen at once that the first two data need not be changed, it being only required to annually change the year of the license plate. This seems to make it unnecessary to furnish an entire new license plate every year if suitable provision can be made whereby that small portion of the plate identifying the year can be exchanged. It is the object of the present invention to provide a license plate of the character described to which a small plate having the year imprinted thereon can be detachably secured without impairing the neat appearance of the plate as a whole. It is further proposed to provide suitable places to which other plates giving additional information, such as the name of the dealer who sold the machine, and the home city of the owner, may be detachably secured.

With these objects in view we have shown the preferred form of our invention in the accompanying drawing, in which Figure 1 shows an elevation of the plate indicating the places to which the additional plates may be detachably secured; Figure 2 a cross section through the same along line 2—2 of Figure 1; Figure 3 an elevation of the plate with the different additional plates in their respective places, and Figure 4 a vertical cross section through the same along line 4—4 of Figure 3. While we have shown only the preferred form of our invention, it should be understood that various changes or modifications may be made within the scope of the claim hereto attached without departing from the spirit of the invention.

Our license plate (1), preferably rectangular in shape, and of the dimensions ordinarily used, has the license number (2) and the name of the licensing State (3) permanently imprinted thereon, the license number occupying the main portion of the license plate, while the name of the State is arranged to the left of the same. On the right hand side of the plate, occupying a space substantially symmetrical with that occupied by the name of the State, is a depression (4) preferably rectangular in form and running parallel to the edge (6) of the license plate. At the two opposing ends (7) and (8) of the depression the same is disconnected from the main plate so as to leave slots (9) through which may be inserted the ends (11) of an additional plate (12) which fits the depressions so that its upper surface is substantially flush with the upper surface of the license plate. This additional plate is secured to the main plate by any suitable means, as for instance, the bolts (13) engaging the ends (11) with the license plate and secured by means of nuts (14). This additional plate has the year imprinted thereon and can be readily exchanged for a new one at the end of the year.

We further provide two depressions (16) and (17), the former running along the upper edge of the license plate and the latter along the lower edge. These depressions are adapted to have additional plates (18) and (19) detachably secured thereto by any suitable means, as by the screws (21). The upper one of these two plates is preferably used to identify the dealer or any other name who sold the motor vehicle and the lower one to identify the home city of the owner. These additional plates (18) and (19) need not be used if not desired, and their absence will not injure the appearance of the license plate since the places reserved for them may be taken by the observer as intended for merely decorating purposes. A beaded rim (22) is provided around the whole license plate for fortifying and ornamental purposes.

We claim:

In combination, a license plate for motor vehicles having a rectangular depression therein disconnected from the plate at opposing ends so as to leave slots between the depression and the plate, and a second plate having a raised central portion fitting in said depression and end portions adapted to be slipped through said slots underneath the license plate and to be detachably secured thereto so as to present an upper surface flush with the surface of the license plate.

DON McRUER.
JAMES E. SELLERS.